United States Patent
Kim et al.

(10) Patent No.: US 10,599,467 B2
(45) Date of Patent: Mar. 24, 2020

(54) COMPUTING SYSTEMS AND METHODS OF OPERATING COMPUTING SYSTEMS

(71) Applicants: Dong-Gun Kim, Hwaseong-si (KR); Won-Moon Cheon, Hwaseong-si (KR)

(72) Inventors: Dong-Gun Kim, Hwaseong-si (KR); Won-Moon Cheon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 15/713,007

(22) Filed: Sep. 22, 2017

(65) Prior Publication Data

US 2018/0113736 A1 Apr. 26, 2018

(30) Foreign Application Priority Data

Oct. 21, 2016 (KR) .................. 10-2016-0137750

(51) Int. Cl.
- *G06F 12/00* (2006.01)
- *G06F 9/48* (2006.01)
- *G06F 12/02* (2006.01)
- *G06F 3/06* (2006.01)

(52) U.S. Cl.
CPC .......... *G06F 9/4843* (2013.01); *G06F 3/0607* (2013.01); *G06F 12/0246* (2013.01); *G06F 12/0284* (2013.01); *G06F 12/0238* (2013.01)

(58) Field of Classification Search
CPC .......................... G06F 9/4843; G06F 12/0246
See application file for complete search history.

(56) References Cited

U.S. PATENT DOCUMENTS

| | | |
|---|---|---|
| 8,725,963 B1 | 5/2014 | Emelianov et al. |
| 9,110,757 B2 | 8/2015 | Tian et al. |
| 9,195,579 B2 | 11/2015 | Kwon et al. |
| 2003/0188121 A1* | 10/2003 | Roy ............... G06F 12/023 711/171 |
| 2010/0312955 A1 | 12/2010 | Hwang et al. |
| 2010/0318727 A1 | 12/2010 | Lee et al. |
| 2012/0079156 A1* | 3/2012 | Safranek ........ G06F 12/0835 710/305 |
| 2012/0151127 A1 | 6/2012 | Lim |
| 2014/0143518 A1 | 5/2014 | Kim et al. |
| 2015/0006834 A1* | 1/2015 | Dulloor ............ G06F 3/0604 711/162 |

(Continued)

FOREIGN PATENT DOCUMENTS

| | | |
|---|---|---|
| KR | 1020120066198 A | 6/2012 |
| KR | 1020150139017 A | 12/2015 |

(Continued)

*Primary Examiner* — Jae U Yu
(74) *Attorney, Agent, or Firm* — Myers Bigel, P.A.

(57) ABSTRACT

A computing system includes a host and a storage device. The host includes a central processing unit (CPU) and a first volatile memory device. The storage device includes a second volatile memory device and a nonvolatile memory device. The CPU uses the first volatile memory device and the second volatile memory device as a main memory to store temporary data used for operation of the CPU. The CPU determines a swap-out page to be swapped-out of first pages stored in the first volatile memory device, determines a swap-in page to be swapped-in of second pages stored in the second volatile memory device, and exchanges the swapped-out page and the swapped-in page.

15 Claims, 8 Drawing Sheets

(56) References Cited

U.S. PATENT DOCUMENTS

| | | |
|---|---|---|
| 2015/0193354 A1 | 7/2015 | Kwon et al. |
| 2015/0193464 A1 | 7/2015 | Kwon et al. |
| 2015/0227454 A1 | 8/2015 | Lee et al. |
| 2015/0261616 A1 | 9/2015 | Lim et al. |
| 2015/0347042 A1 | 12/2015 | Kim et al. |
| 2016/0246502 A1 | 8/2016 | Choi |

FOREIGN PATENT DOCUMENTS

| | | |
|---|---|---|
| KR | 10-1612922 | 4/2016 |
| KR | 101635704 B1 | 7/2016 |

\* cited by examiner

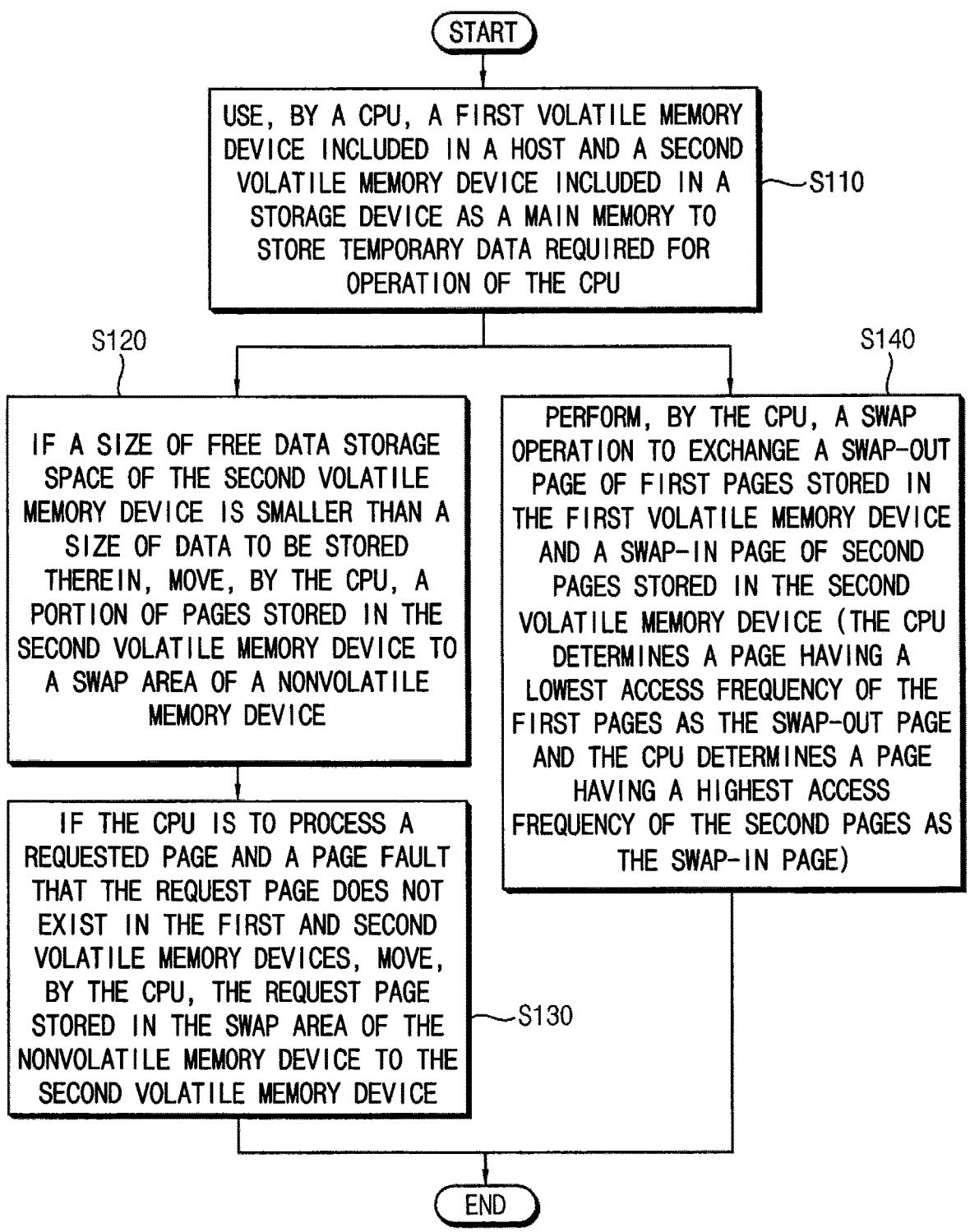

COMPUTING SYSTEMS AND METHODS OF OPERATING COMPUTING SYSTEMS

CROSS-REFERENCE TO RELATED APPLICATION

This US application claims priority under 35 USC § 119 to Korean Patent Application No. 10-2016-0137750, filed on Oct. 21, 2016, in the Korean Intellectual Property Office (KIPO), the disclosure of which is incorporated in its entirety by reference herein.

BACKGROUND

1. Technical Field

Exemplary embodiments relate generally to computing systems, and more particularly to computing systems including a host and an attached storage device.

2. Discussion of the Related Art

In general, an operating system (OS) running on a central processing unit (CPU) of a computing system uses a Dynamic Random Access Memory (DRAM) as a main memory to store temporary data.

While the OS is operating, when a size of the temporary data used by the CPU is greater than a size of the storage capacity of the DRAM, the OS performs a swap operation to move a portion of the temporary data stored in the DRAM to a storage device, such as a solid state drive (SSD).

Because the swap operation includes data exchanges between a host and the storage device, a thrashing phenomenon may occur when the swap operation is frequently performed.

SUMMARY

Some exemplary embodiments are directed to provide a computing system that may reduce overhead caused by a swap operation.

Some exemplary embodiments are directed to provide a method of operating a computing system that may reduce overhead caused by a swap operation.

According to some exemplary embodiments, a computing system includes a host and a storage device. The host includes a central processing unit (CPU) and a first volatile memory device. The storage device includes a second volatile memory device and a nonvolatile memory device. The CPU uses the first volatile memory device and the second volatile memory device as a main memory to store temporary data used for operation of the CPU.

According to some exemplary embodiments, in a method of operating a computing system including a host and a storage device, wherein the host includes a central processing unit (CPU) and a first volatile memory device and the storage device includes a second volatile memory device and a nonvolatile memory device, the first volatile memory device and the second volatile memory device is used by the CPU as a main memory to store temporary data required for operation of the CPU, when a size of a free storage space of the second volatile memory device is smaller than a size of data to be stored therein, a portion of pages stored in the second volatile memory device is moved by a swap controller in the storage device to a swap area of the nonvolatile memory device, and when the CPU requests a page to be processed and the requested page does not exist in the first and second volatile memory devices, the requested page stored in the swap area of the nonvolatile memory device is moved by the CPU to the second volatile memory device.

According to some exemplary embodiments, a computer system comprises a host comprising a central processing unit (CPU) and a first volatile memory device, a storage device comprising a second volatile memory device and a nonvolatile memory device, and a swap controller. The CPU is configured to perform operations comprising copying first pages stored in the first volatile memory device into the second volatile memory device. The swap controller is configured to perform operations comprising copying second pages stored in the second volatile memory device to the nonvolatile memory device when the computing system is powered off, the second pages comprising the first pages copied from the first volatile memory device.

Accordingly, the computing system may increase storage capacity of the main memory of the CPU efficiently. In addition, the CPU may efficiently reduce or prevent the thrashing phenomenon even when the swap-out operation and the swap-in operation are frequently performed due to the size of the temporary data used for operation of the CPU.

It is noted that aspects of the inventive concepts described with respect to one embodiment, may be incorporated in a different embodiment although not specifically described relative thereto. That is, all embodiments and/or features of any embodiment can be combined in any way and/or combination. These and other aspects of the inventive concepts are described in detail in the specification set forth below.

BRIEF DESCRIPTION OF THE DRAWINGS

Illustrative, non-limiting exemplary embodiments will be more clearly understood from the following detailed description in conjunction with the accompanying drawings.

FIG. 8 is a flow chart illustrating a method of operating a computing system according to further exemplary embodiments of the inventive concept.

DETAILED DESCRIPTION OF THE EMBODIMENTS

Various exemplary embodiments will be described more fully hereinafter with reference to the accompanying drawings, in which some exemplary embodiments are shown.

Figure 1:
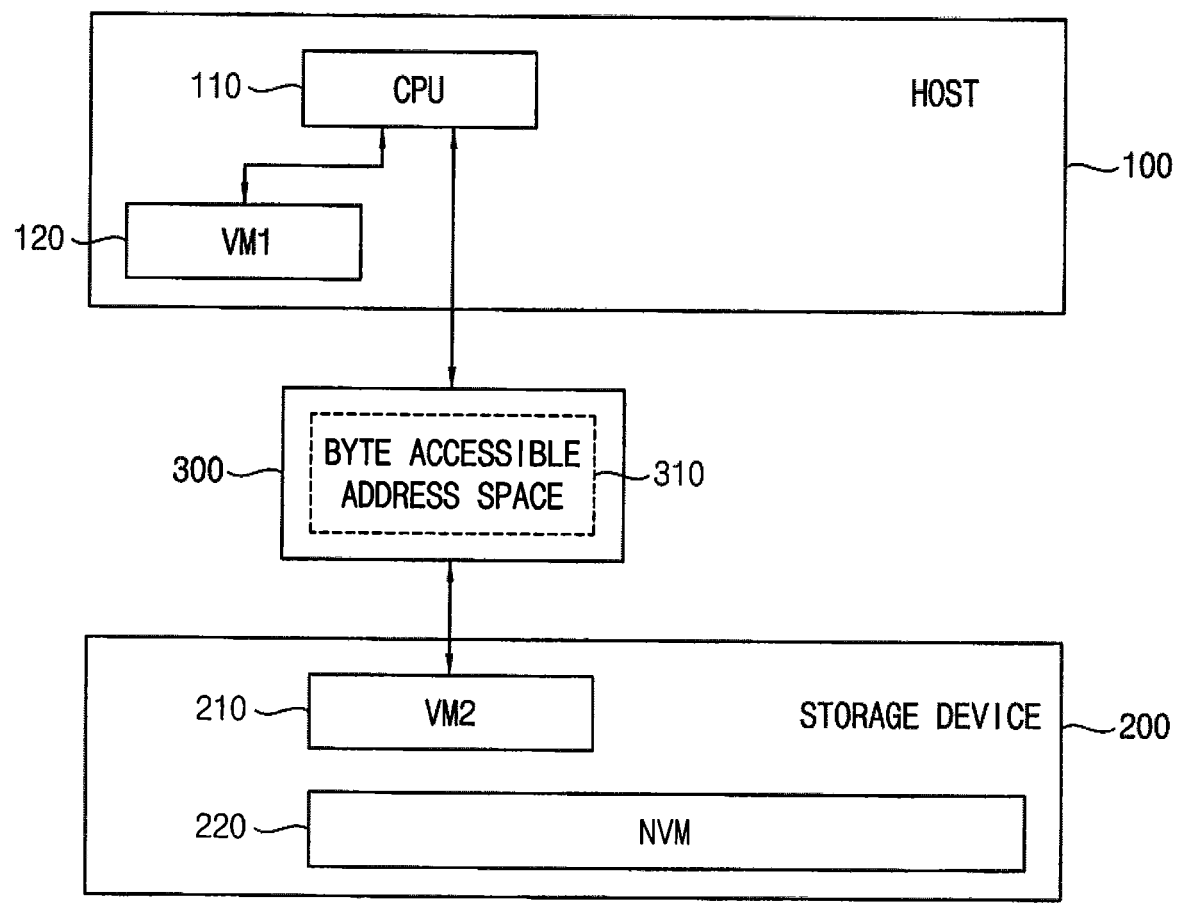
FIG. 1 is a block diagram illustrating a computing system according to exemplary embodiments of the inventive concept.

FIG. 1 is a block diagram illustrating a computing system according to exemplary embodiments of the inventive concept.

Referring to FIG. 1, a computing system 10 may include a host 100 and a storage device 200.

The host 100 may communicate with the storage device 200 through various interface protocols, such as Peripheral Component Interconnect-Express (PCI-E), Advanced Technology Attachment (ATA), Serial ATA (SATA), Parallel ATA (PATA), and/or Serial Attached SCSI (SAS). In addition, the host 100 may also communicate with the storage device 200 through interface protocols, such as Universal Serial Bus (USB), Multi-Media Card (MMC), Enhanced Small Disk Interface (ESDI), and/or Integrated Drive Electronics (IDE).

The host 100 includes a central processing unit (CPU) 110 and a first volatile memory device (VM1) 120.

The CPU 110 controls overall operations of the computing system 10. For example, the CPU 110 may execute applications, such as a web browser, a game application, a video player, etc. In some embodiments, the CPU 110 may include a single core or multiple cores. For example, the CPU 110 may be a multi-core processor, such as a dual-core processor, a quad-core processor, a hexa-core processor, etc. The CPU 110 may include an internal or external cache memory.

In some exemplary embodiments, the first volatile memory device 120 may be implemented using a DRAM. In other exemplary embodiments, the first volatile memory device 120 may be implemented using any type of volatile memory device, such as a static random access memory (SRAM).

When the first volatile memory device 120 includes a DRAM, the first volatile memory device 120 may include a memory cell array having a plurality of dynamic memory cells, a row decoder, a column decoder and a control logic circuit.

The row decoder is coupled to the memory cell array through word-lines and the column decoder is coupled to the memory cell array through bit-lines. The first volatile memory device 120 may further include a refresh control circuit to perform refresh operations on the dynamic memory cells.

The storage device 200 may include a second volatile memory device (VM2) 210 and a nonvolatile memory device (NVM) 220.

The storage device 200 may be implemented using a solid state drive (SSD). In other exemplary embodiments, the storage device 200 may be implemented using any type of storage device.

In some exemplary embodiments, the storage device 200 may be packaged using various package types or package configurations, such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

In some exemplary embodiments, the second volatile memory device 210 may be connected to the CPU 110 in the host 100 through a PCIe bus 300.

The storage device 200 may provide the host 100 with a byte accessible interface, which permits access to data on a byte-basis stored in the second volatile memory device 210 by using a byte accessible address space 310 corresponding to a size of the storage capacity of the second volatile memory device 210. That is, a size of the byte accessible address space 310 may be substantially the same as the size of storage capacity of the second volatile memory device 210.

Therefore, the CPU 110 may directly access the data stored in the second volatile memory device 210 on a byte-basis through the PCIe bus 300 by using the byte accessible address space 310.

In some exemplary embodiments, the second volatile memory device 210 may be implemented using a DRAM. In other exemplary embodiments, the second volatile memory device 210 may be implemented using any type of volatile memory device, such as an SRAM. When the second volatile memory device 210 includes a DRAM, the second volatile memory device 210 may include a memory cell array having a plurality of dynamic memory cells, a row decoder, a column decoder and a control logic circuit.

In some exemplary embodiments, the nonvolatile memory device 220 may be implemented using a NAND flash memory. In other exemplary embodiments, the nonvolatile memory device 220 may be a nonvolatile memory device, such as Phase Change Random Access Memory (PRAM), Resistance Random Access Memory (RRAM), Magneto-resistive Random Access Memory (MRAM), Ferroelectric random access memory (FRAM), etc.

When the nonvolatile memory device 220 includes a NAND flash memory, the nonvolatile memory device 220 may include a memory cell array having a plurality of nonvolatile memory cells, a page buffer circuit, a data input/output (I/O) circuit, an address decoder, a voltage generator and a control circuit.

The memory cell array may be coupled to the address decoder through a string selection line, a plurality of word-lines, and a ground selection line. In addition, the memory cell array may be coupled to the page buffer circuit through a plurality of bit-lines. The data I/O circuit may be coupled to the page buffer circuit through a plurality of data lines.

The voltage generator may generate word-line voltages, which are used for the operation of the nonvolatile memory device 220. The word-line voltages may be applied to the plurality of word-lines through the address decoder. The control circuit may control the page buffer circuit, the data I/O circuit and the voltage generator.

In some exemplary embodiments, the memory cell array may be a three-dimensional memory cell array, which is formed on a substrate in a three-dimensional structure (or a vertical structure). In these embodiments, the memory cell array may include vertical cell strings that are vertically oriented, such that at least one memory cell is located over another memory cell. The following patent documents, which are hereby incorporated by reference, describe suitable configurations for three-dimensional memory cell arrays: U.S. Pat. Nos. 7,679,133; 8,553,466; 8,654,587; 8,559,235; and US Pat. Pub. No. 2011/0233648.

In other exemplary embodiments, the memory cell array may be a two-dimensional memory cell array, which is formed on a substrate in a two-dimensional structure (or a horizontal structure).

In addition, the page buffer circuit and the data I/O circuit may read data from a first area of the memory cell array and may write the read data to a second area of the memory cell array. That is, the page buffer circuit and the data I/O circuit may perform a copy-back operation.

The CPU 110 may use the first volatile memory device 120 and the second volatile memory device 210 as a main memory to store temporary data used for operation of the CPU 110.

For example, applications executed by the CPU 110 may operate by using the first volatile memory device 120 and the second volatile memory device 210 as a main memory.

In some exemplary embodiments, the CPU 110 may use the first volatile memory device 120 as a first main memory operating in an upper layer and may use the second volatile memory device 210 as a second main memory operating in a lower layer.

In some exemplary embodiments, the CPU 110 may store a page of the temporary data having a relatively higher access frequency in the first volatile memory device 120 and may store a page of the temporary data having a relatively lower access frequency in the second volatile memory device 210.

Figure 2:
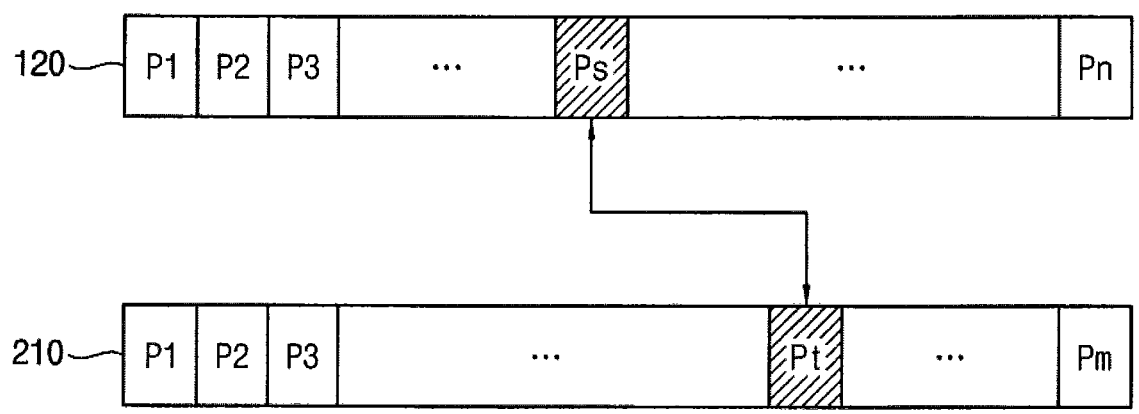
FIG. 2 is a block diagram that illustrates management of the first and second volatile memory devices of FIG. 1 according to exemplary embodiments of the inventive concept.

FIG. 2 is a block diagram that illustrates management of the first and second volatile memory devices 120 and 210, respectively, according to some exemplary embodiments of the inventive concept.

As shown in FIG. 2, the first volatile memory device 120 stores first through n-th pages P1~Pn and the second volatile memory device 210 stores first through m-th pages P1~Pm. Here, n and m are positive integers, respectively.

As illustrated in FIG. 2, the CPU 110 may determine a page having a lowest access frequency of the first through n-th pages P1~Pn as a swap-out page Ps to be swapped-out and may determine a page having a highest access frequency of the first through m-th pages P1~Pm as a swap-in page Pt to be swapped-in. Here, s is a positive integer equal to or smaller than n, and t is a positive integer equal to or smaller than m.

The CPU 110 may perform a swap operation to exchange the swap-out page Ps stored in the first volatile memory device 120 with the swap-in page Pt stored in the second volatile memory device 210.

In some exemplary embodiments, the CPU 110 may perform the swap operation periodically according to a predetermined time period.

The CPU 110 may store a page having a relatively higher access frequency of pages in the temporary data in the first volatile memory device 120 and may store a page having a relatively lower access frequency of pages in the temporary data in the second volatile memory device 210.

Figure 3:
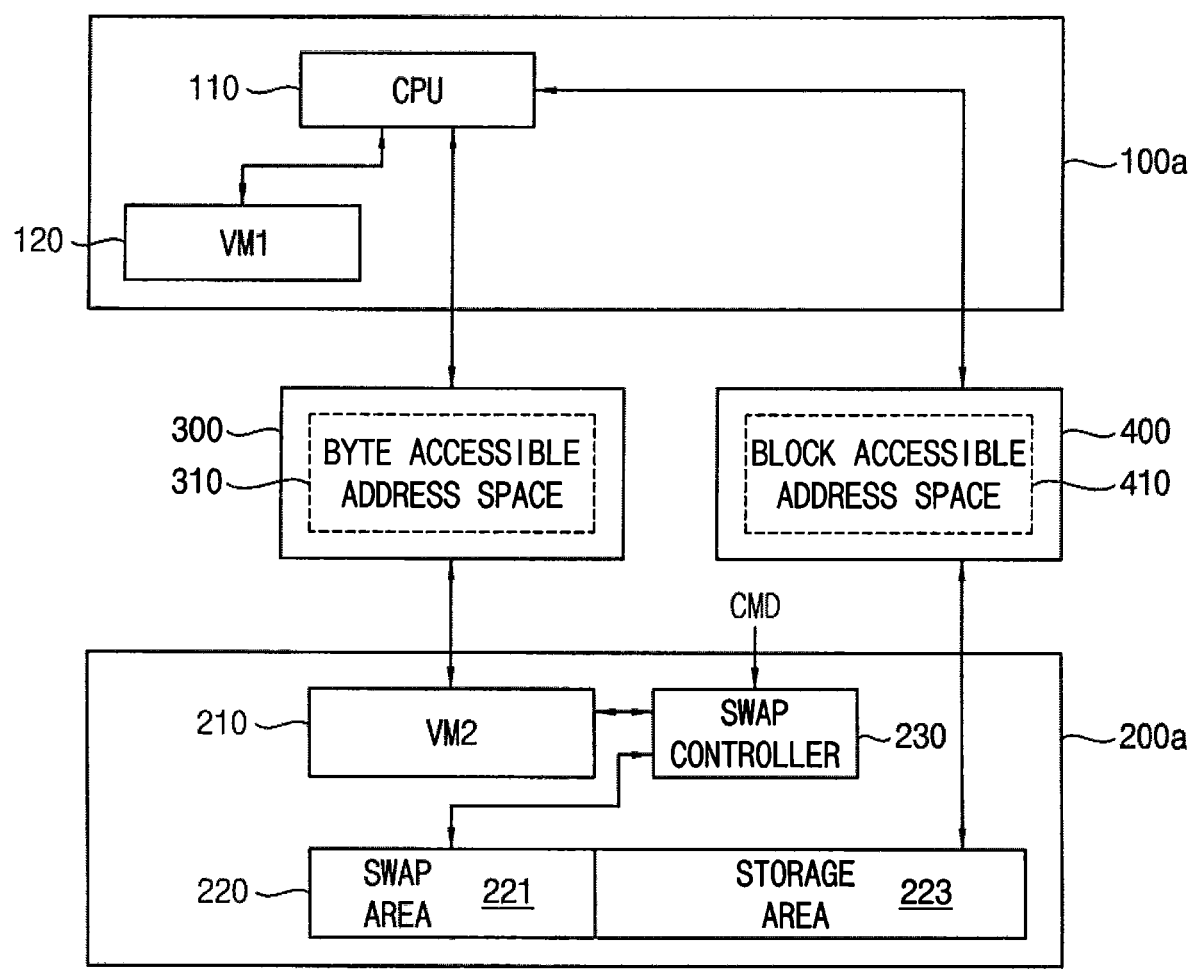
FIG. 3 is a block diagram illustrating an example of a computing system according to further exemplary embodiments of the inventive concept.

FIG. 3 is a block diagram illustrating an example of a computing system according to further exemplary embodiments of the inventive concept.

Referring to FIG. 3, a computing system 10a may include a host 100a and a storage device 200a.

The host 100a includes a CPU 110 and a first volatile memory device 120.

The storage device 200a includes a second volatile memory device 210, a nonvolatile memory device 220, and a swap controller 230.

The nonvolatile memory device 220 may include a swap area 221 and a storage area 223.

A portion of the first through m-th pages P1~Pm stored in the second volatile memory device 210 may be stored in the swap area 221.

The swap controller 230 may access the swap area 221.

The storage area 223 may store data provided from the CPU 110.

In exemplary embodiments, the storage area 223 may be coupled to the CPU 110 included in the host 100a through a SATA bus 400.

In other exemplary embodiments, the storage area 223 may be coupled to the CPU 110 included in the host 100a through a Non-Volatile Memory Express (NVMe) bus 400.

In other exemplary embodiments, the storage area 223 may be coupled to the CPU 110 included in the host 100a through a Serial Attached SCSI (SAS) bus 400.

The storage device 200a may provide the host 100a with a block accessible interface, which permits access to data on a block-basis stored in the storage area 223 using a block accessible address space 410 corresponding to a size of storage capacity of the storage area 223.

Therefore, the CPU 110 may access the data stored in the storage area 223 on a block-basis through the SATA bus 400, the NVMe bus 400, or the SAS bus 400 by using the block accessible address space 410.

When a size of free storage space of the second volatile memory device 210 is smaller than a size of data to be stored therein, the CPU 110 may determine a page having a relatively lower access frequency of the first through m-th pages P1~Pm stored in the second volatile memory device 210 as a swap-out page, and may perform a swap-out operation to move the swap-out page to the swap area 221 of the nonvolatile memory device 220.

When the CPU 110 requests the swap-out page which has been moved to the swap area 221 of the nonvolatile memory device 220 through the swap-out operation, a page fault may be generated indicating that the requested page does not exist in the first and second volatile memory devices 120 and 210. In this case, the CPU 110 may perform a swap-in operation to move the requested page stored in the swap area 221 to the second volatile memory device 210. The CPU 110 may operate by using the requested page restored to the second volatile memory device 210.

In exemplary embodiments, the swap controller 230 may receive a command signal CMD from the CPU 110. The swap controller 230 may perform one of a swap-in operation and a swap-out operation based on the received command signal CMD. The swap controller 230 may move a page having a relatively lower access frequency of the first through m-th pages P1~Pm stored in the second volatile memory device 210 to the swap area 221 by performing the swap-out operation, and may move a page requested by the CPU 110 of pages swapped-out in the swap area 221 to the second volatile memory device 210 by performing the swap-in operation.

Figure 4:
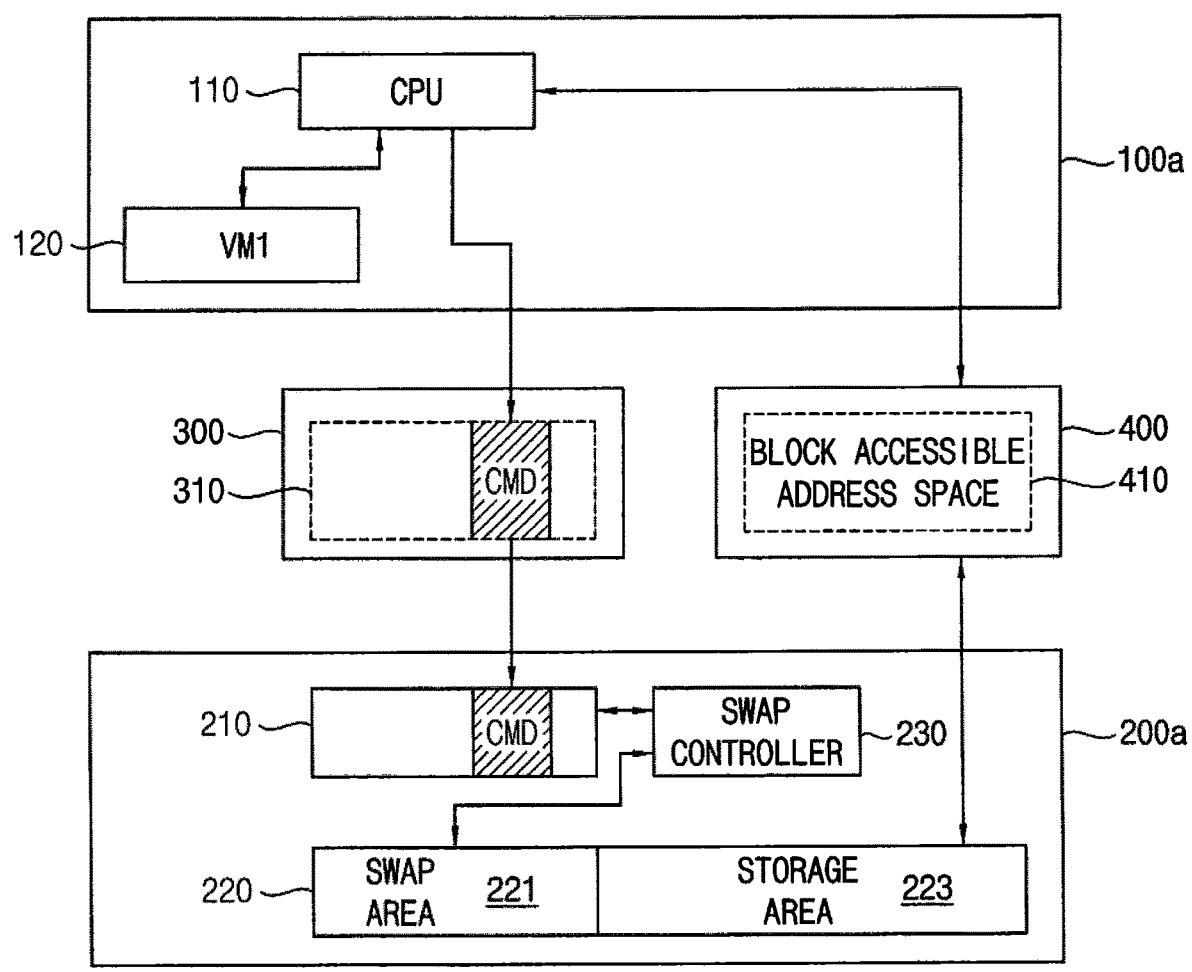
FIG. 4 is a block diagram that illustrates operation of the swap controller of FIG. 3 according to exemplary embodiments of the inventive concept.

FIG. 4 is a block diagram that illustrates operations of the swap controller of the computing system of FIG. 3 according to some exemplary embodiments of the inventive concept.

Referring to FIG. 4, in some exemplary embodiments, the CPU 110 may store the command signal CMD in a predetermined area of the second volatile memory device 210 through the byte accessible address space 310.

In this case, the swap controller 230 may perform one of the swap-out operation and the swap-in operation based on the command signal CMD stored in the predetermined area.

Figure 5:
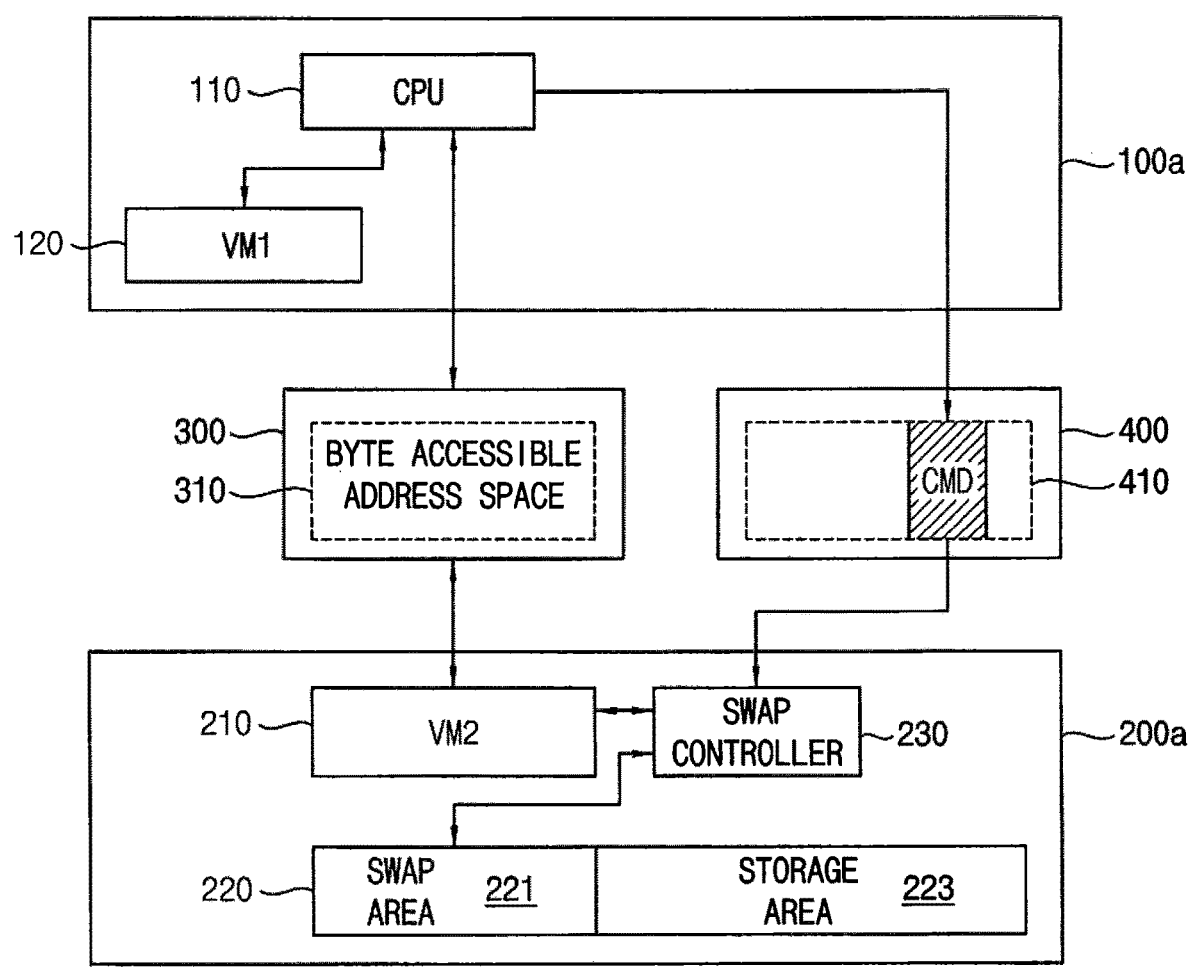
FIG. 5 is a block diagram that illustrates operations of the swap controller of FIG. 3 according to further exemplary embodiments of the inventive concept.

FIG. 5 is a block diagram that illustrates operations of the swap controller of the computing system of FIG. 3 according to further exemplary embodiments of the inventive concept.

Referring to FIG. 5, in some exemplary embodiments, the CPU 110 may provide the command signal CMD to the swap controller 230 through the block accessible address space 410.

In this case, the swap controller 230 may perform one of the swap-out operation and the swap-in operation based on the command signal CMD provided through the block accessible interface 400.

Figure 6:
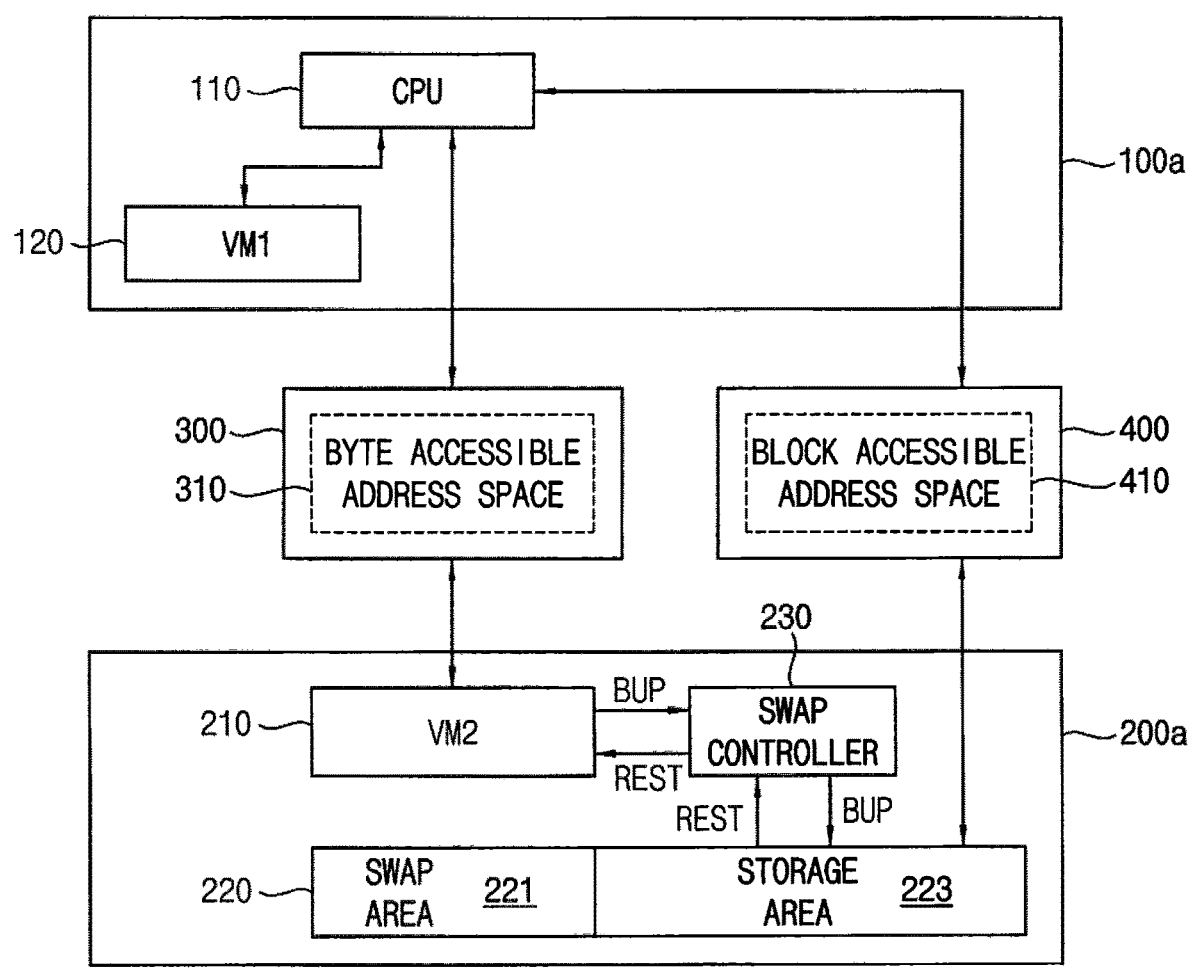
FIG. 6 is a block diagram that illustrates operations of the swap controller of FIG. 3 according to further exemplary embodiments of the inventive concept.

FIG. 6 is a block diagram that illustrates operations of the swap controller of the computing system of FIG. 3 according to further exemplary embodiments of the inventive concept.

Referring to FIG. 6, when the computing system 10a is powered-off, the swap controller 230 may back-up BUP the first through m-th pages P1~Pm stored in the second volatile memory device 210 in the storage area 223 of the nonvolatile memory device 220.

In exemplary embodiments, when the computing system 10a is powered-off, the CPU copies the first through n-th pages P1~Pn stored in the first volatile memory device 120 to the second volatile memory device 210, and the swap controller 230 may back-up BUP the first through n-th pages P1~Pn stored in the second volatile memory device 210 from the first volatile memory device 120 along with the existing pages from the second volatile memory device 210 in the storage area 223 of the nonvolatile memory device 220.

Therefore, when the computing system 10a is powered-off, the temporary data stored in the first and second volatile memory devices 120 and 210, which operate as the main memory of the CPU 110 may be safely backed-up in the storage area 223 of the nonvolatile memory device 220.

When the computing system 10a is powered-on, the swap controller 230 may restore REST the first through n-th pages P1~Pn backed-up in the storage area 223 of the nonvolatile memory device 220 to the second to the second volatile memory device 210, and the CPU 110 may recover the recovered first through n-th pages P1~Pn to the first volatile memory device 120.

In addition, when the computing system 10a is powered-on, the swap controller 230 may restore the first through m-th pages P1~Pm backed-up in the storage area 223 of the nonvolatile memory device 220 to the second volatile memory device 210.

Therefore, when the computing system 10a is powered-on, the temporary data stored in the first and second volatile memory devices 120 and 210 before the computing system 10a is powered-off may be safely recovered to the first and second volatile memory devices 120 and 210 from the storage area 223 of the nonvolatile memory device 220.

Accordingly, the CPU 110 may resume operation quickly by using the temporary data recovered to the first and second volatile memory devices 120 and 210.

As described with reference to FIGS. 1 through 6, the CPU 110 in the computing system 10 operates by using the second volatile memory device 210 included in the storage device 200 as the main memory in addition to using the first volatile memory device 120 included in the host 100 as the main memory.

Therefore, storage capacity of the main memory of the CPU 110 may be efficiently increased.

When a size of the temporary data required for operation of the CPU is greater than a sum of a free storage capacity of the first volatile memory device 120 and a free storage capacity of the second volatile memory device 210, the swap controller 230 may perform the swap-out operation to move a page having a lowest access frequency of the first through m-th pages P1~Pm stored in the second volatile memory device 210 to the swap area 221. In addition, when the CPU 110 requests a page which is swapped-out to the swap area 221 of the nonvolatile memory device 220 for processing the page, the swap controller 230 may perform the swap-in operation to move the requested page or pages swapped-out in the swap area 221 to the second volatile memory device 210.

As described above, because the swap-out operation and the swap-in operation are performed internally in the storage device 200a, data is not transmitted/received between the host 100a and the storage device 200a while the swap-out operation and the swap-in operation are performed.

Therefore, the CPU 110 in the computing system 10 may efficiently reduce or prevent the thrashing phenomenon even when the swap-out operation and the swap-in operation are frequently performed because a size of the temporary data required for operation of the CPU is great. In the trashing phenomenon, resources in the computing system 10 may be excessively used in restoring swapped-out pages.

Figure 7:
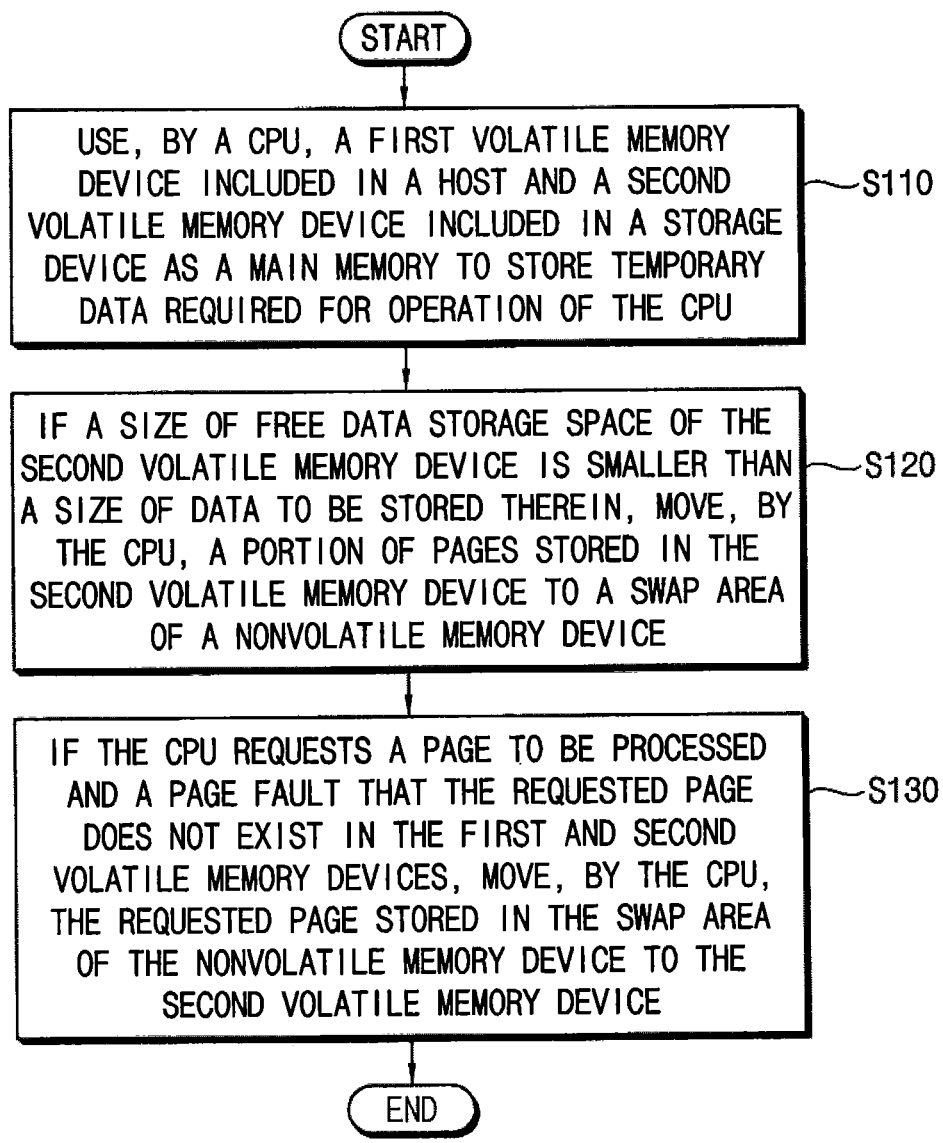
FIG. 7 is a flow chart illustrating a method of operating a computing system according to exemplary embodiments of the inventive concept.

FIG. 7 is a flow chart illustrating a method of operating a computing system according to some exemplary embodiments of the inventive concept.

The method illustrated in FIG. 7 may be performed by the computing system 10 of FIG. 1.

Hereinafter, there will be description of a method of operating the computing system 10 according to some exemplary embodiments with reference to FIGS. 1 through 7.

The CPU 110 in the host 100 uses a first volatile memory device 120 included in the host 100 and a second volatile memory device 210 included in the storage device 200 as a main memory to store temporary data used for operation of the CPU 110 (S110).

While the CPU 110 is operating, if a size of a free storage space of the second volatile memory device 210 is smaller than a size of data to be stored therein, the CPU 110 determines a page having a relatively lower access frequency of first through m-th pages P1~pm stored in the second volatile memory device 210 as a swap-out page to be swapped-out and performs a swap-out operation to move the swap-out page to a swap area 221 of the nonvolatile memory device 220 (S120). When the CPU 110 requests a page that is swapped-out to the swap area 221 of the nonvolatile memory device 220, a page fault is generated indicating that the requested page does not exist in the first and second volatile memory devices 120 and 210. When the page fault occurs, the CPU 110 may perform a swap-in operation to move the requested page stored in the swap area 221 of the nonvolatile memory device 220 to the second volatile memory device 210 (S130).

The CPU 110 may process the requested page restored to the second volatile memory device 210.

FIG. 8 is a flow chart illustrating a method of operating a computer system according to further exemplary embodiments of the inventive concept.

Referring to FIG. 8, the CPU 110 determines a swap-out page Ps to be swapped-out of first through n-th pages P1~Pn stored in the first volatile memory device 120, determines a swap-in page Ps to be swapped-in of first through m-th pages P1~Pm stored in the second volatile memory device 220 and performs a swap operation to exchange the swap-out page Ps stored in the first volatile memory device 120 and the swap-in page Ps stored in the second volatile memory device 220 (S140). Operations corresponding to S110, S120, and S130 have been described above with respect to FIG. 7.

The CPU 110 may perform the swap operation periodically according to a predetermined time period according to some exemplary embodiments.

The CPU 110 may perform the swap operation simultaneously as one of the swap-out operation and the swap-in operation.

Because operations of the computing system 10 and the computing system 10a have been described in detail with reference to FIGS. 1 through 6, detailed description of method of operating the computing systems 10 and 10 with reference to FIGS. 7 and 8 will be omitted.

The present disclosure may be applied to various computing system including a storage device. For example, the present disclosure may be applied to systems including, but not limited to a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims.

What is claimed is:

1. A computing system, comprising:
a host comprising a central processing unit (CPU) and a first volatile memory device; and
a storage device comprising a swap controller, a second volatile memory device, and a nonvolatile memory device, the nonvolatile memory device comprising a swap area and a storage area,
wherein the CPU is configured to perform operations comprising:
using the first volatile memory device and the second volatile memory device as a main memory to store temporary data used for operation of the CPU, and
wherein the swap controller is configured to perform operations comprising:
receiving a command signal from the CPU through a block accessible interface; and
performing a swap-out operation moving data from the second volatile memory device to the swap area of the nonvolatile memory device or a swap-in operation moving data from the swap area of the nonvolatile memory device to the second volatile memory device based on the command signal,
wherein the block accessible interface is configured to provide access to data stored in the storage area of the nonvolatile memory device on a block-basis by using a block accessible address space corresponding to a size of the storage area of the nonvolatile memory device.

2. The computing system of claim 1, wherein the CPU is configured to perform operations comprising:
determining a swap-out page to be swapped-out of a plurality of first pages stored in the first volatile memory device;
determining a swap-in page to be swapped-in of a plurality of second pages stored in the second volatile memory device; and
performing a swap operation to exchange the swap-out page stored in the first volatile memory device and the swap-in page stored in the second volatile memory device.

3. The computing system of claim 2, wherein:
the swap-out page is a page having a lowest access frequency of the first pages, and
the swap-in page is a page having a highest access frequency of the second pages.

4. The computing system of claim 2, wherein the swap operation is performed periodically according to a predetermined time period.

5. The computing system of claim 2,
wherein the swap area is configured to store a portion of the second pages; and
wherein the storage area is configured to store data provided from the CPU.

6. The computing system of claim 5, wherein the CPU is further configured to perform operations comprising:
determining a swap-out page to be swapped-out of the plurality of first pages stored in the second volatile memory device when a size of free storage space of the second volatile memory device is smaller than a size of data to be stored therein; and
performing the swap-out operation to move the swap-out page to the swap area of the nonvolatile memory device.

7. The computing system of claim 5, wherein the CPU is configured to perform operations comprising:
when the CPU requests a page to be processed and a page fault is generated that the requested page does not exist in the first and second volatile memory devices,
performing the swap-in operation to move the requested page stored in the swap area of the nonvolatile memory device to the second volatile memory device when the page fault is generated because the requested page is not in the first and second volatile memory devices.

8. The computing system of claim 5,
wherein the swap-out operation further comprises moving the portion of the second pages to the swap area of the nonvolatile memory device, and
wherein the swap-in operation further comprises moving the portion of the second pages stored in the swap area of the nonvolatile memory device to the second volatile memory device.

9. The computing system of claim 8, wherein the CPU is further configured to perform operations comprising:
storing the command signal in a predetermined area of the second volatile memory device; and
wherein the swap controller is further configured to perform operations comprising:
performing one of the swap-out operation and the swap-in operation based on the command signal stored in the predetermined area of the second volatile memory device.

10. The computing system of claim 8, wherein the swap controller is further configured to perform operations comprising:
performing a back-up of the first pages stored in the second volatile memory device in the storage area of the nonvolatile memory device when the computing system is powered-off, and
restoring the first pages that are backed-up in the storage area of the nonvolatile memory device to the second volatile memory device when the computing system is powered-on.

11. The computing system of claim 1, wherein the CPU is further configured to directly access the second volatile memory device on a byte-basis by using a byte accessible address interface corresponding to a size of a data storage space of the second volatile memory device.

12. The computing system of claim 1, wherein the CPU is further configured to communicate with the second volatile memory device through a peripheral component interconnect express (PCIe) bus.

13. A method of operating a computing system, comprising:
using, by a central processing unit (CPU) of a host, the first volatile memory device of the host and a second volatile memory device of storage device, coupled to the host, as a main memory to store temporary data used for operation of the CPU, the storage device further comprising a swap controller and a nonvolatile memory device comprising a swap area and a storage area;
receiving, at the swap controller of the storage device, a command signal from the CPU through a block accessible interface; and
performing, using the swap controller, a swap-out operation moving data from the second volatile memory device to the swap area of the nonvolatile memory device or a swap-in operation moving data from the swap area of the nonvolatile memory device to the second volatile memory device based on the command signal,
wherein the block accessible interface is configured to provide access to data stored in the storage area of the nonvolatile memory device on a block-basis by using a block accessible address space corresponding to a size of the storage area of the nonvolatile memory device.

14. The method of claim 13, further comprising:
performing, by the CPU, a swap operation to exchange a swap-out page of first pages stored in the first volatile memory device and a swap-in page of second pages stored in the second volatile memory device;
determining, by the CPU, a page having a lowest access frequency of the first pages as the swap-out page; and
determining, by the CPU, a page having a highest access frequency of the second pages as the swap-in page.

15. The method of claim 13, further comprising:
when a size of a free storage space of the second volatile memory device is smaller than a size of data to be stored therein, moving, by the CPU, a portion of pages stored in the second volatile memory device to the swap area of the nonvolatile memory device; and
when the CPU requests a page to be processed and the page that is requested does not exist in the first and second volatile memory devices, moving, by the CPU, the page that is requested and is stored in the swap area of the nonvolatile memory device to the second volatile memory device.

* * * * *